Dec. 17, 1935.   L A. SHARP   2,024,607
ELECTRICAL RECEPTACLE
Filed June 22, 1934   2 Sheets-Sheet 1
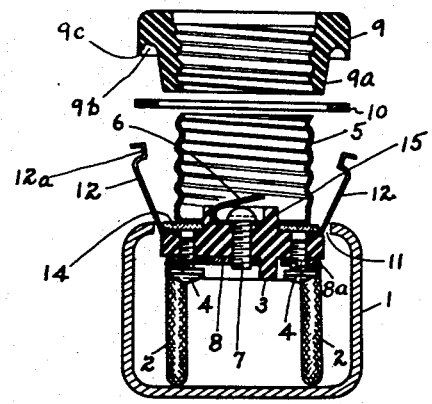
Fig. I
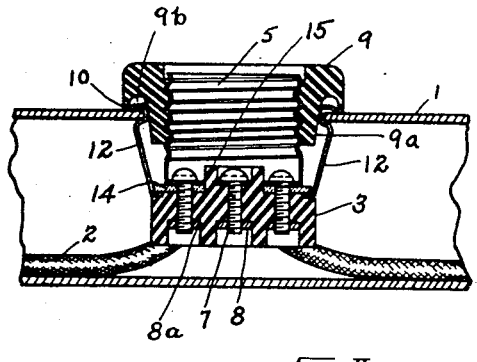
Fig. II
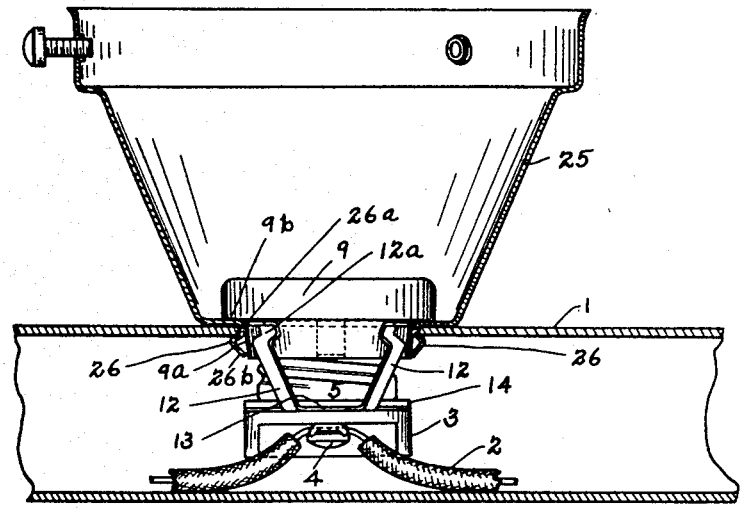
Fig. III
INVENTOR
L. Alan Sharp
BY
Christy and Wharton
ATTORNEYS.

Dec. 17, 1935.   L A. SHARP   2,024,607
ELECTRICAL RECEPTACLE
Filed June 22, 1934   2 Sheets-Sheet 2
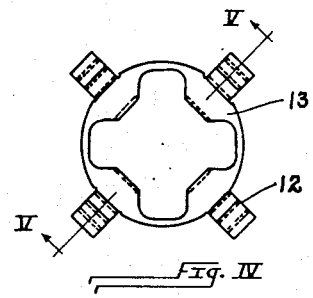
Fig. IV
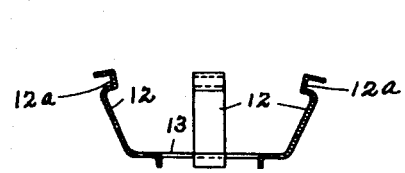
Fig. V
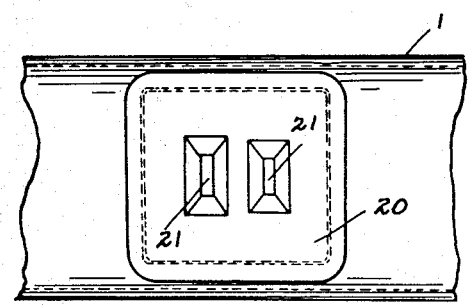
Fig. VI
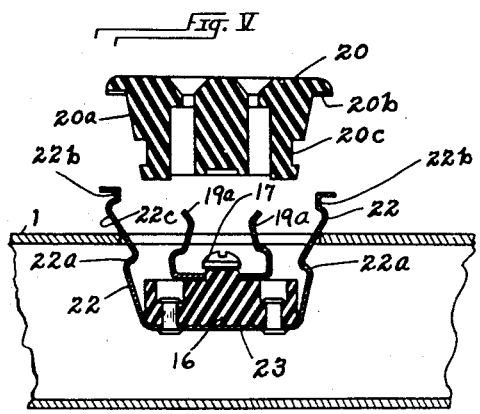
Fig. VII
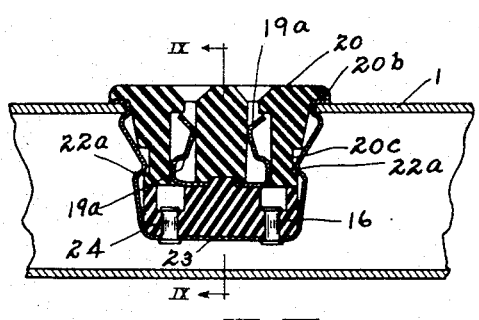
Fig. VIII
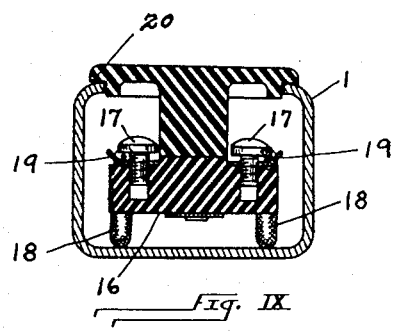
Fig. IX
INVENTOR
L. Alan Sharp
BY
Christy and Wharton
ATTORNEYS Patented Dec. 17, 1935

2,024,607

UNITED STATES PATENT OFFICE 2,024,607

ELECTRICAL RECEPTACLE

L Alan Sharp, Bellevue, Pa., assignor to National Electric Products Corporation, a corporation of Delaware Application June 22, 1934, Serial No. 731,903

9 Claims. (Cl. 247—28)

This invention relates to an electrical receptacle for use in connection with a duct, or conduit, containing wiring.

The receptacle is adapted more specifically for use with a duct, or conduit, drawn or welded in the form of a closed tube, although it may be used with advantage in electrical ducts, or conduits, of the two-piece type comprising a trough, or base, member and a cap, or closure, member arranged to cooperate with each other to provide a closed duct.

For many purposes, electrical conduit of the permanently closed, or single-piece, type is desirable. Such single-piece conduit does not contain any joint or joints for the entrance of moisture, and is, therefore, advantageously employed for electrical lighting in positions which are not within doors, and are not otherwise definitely protected from the weather. Such conduit may be more rapidly and easily installed than two-piece conduit, and gives a greater protection against short-circuiting specifically, and fire hazard generally, than does two-piece conduit.

It has been difficult, however, to install electrical receptacles in a closed, or single-piece, conduit, for the reason that the receptacles must be introduced into the conduit from beyond its outer face, and secured in position extending into the conduit, after electrical connection has been made between the receptacle and the wires within the duct or conduit. Heretofore, relatively unsatisfactory means for mounting receptacles in single-piece ducts have been employed. If openings be made in the outer face of the duct, additional to the simple orifice through which a receptacle is inserted, and the receptacle made to engage with these additional anchorage openings, work upon the duct prior to the insertion of receptacles thereinto is increased, and it is found difficult to seal the additional openings made for anchorage against the entrance of moisture into the duct. It should be understood that, when duct is installed in extended lengths, as for cornice illumination, receptacles are installed at intervals spaced no great distance apart, and the effort expended in inserting a single receptacle into the duct is greatly multiplied throughout the length of the duct-contained wiring.

When two-piece conduit is used as the wire-containing duct, less difficulty is encountered in positioning receptacles, since a receptacle may be positioned at an orifice by insertion thereinto from beyond the inner face of the cover or cap member of the duct. Also it is simple, since access to both sides of the element is provided, to clamp the receptacle in position to be carried by the cover or cap member of the two-piece conduit.

Two-piece conduit is, however, less readily installed than single-piece conduit, and difficulty is frequently experienced, when forming an extended raceway, in mounting the trough or base member of the conduit and attaching the cap, or cover member of the conduit thereto, to form a completely closed duct. For this reason it is desirable to use a receptacle which may be engaged in a simple orifice of a closed duct, by insertion from beyond the outer face of the duct, even though the duct be composed of two-piece conduit. This is for the reason that a receptacle, having the characteristics above-noted, permits a two-piece conduit to be assembled in advance of its installation, with the elements of the conduit firmly engaged with each other, so that it, in some respects, forms a single-piece duct.

For these reasons I have provided a receptacle which may be inserted into a simple duct orifice from beyond the outer face of the duct, and which comprises simple and efficient means for engaging the receptacle to the edge of the orifice in which it is inserted, thus positioning the receptacle in the duct without preparatory work on the duct other than the provision of a simple orifice in its outer face.

I have also provided a receptacle, the parts of which are so arranged as to form a tight, moisture-proof, seal at the duct orifice into which the receptacle is inserted.

In the accompanying drawings, illustrating an embodiment of my invention, Fig. I is a vertical cross-sectional view through a single-piece conduit, and a screw plug type of receptacle made in accordance with the invention, showing the elements of the receptacle aligned but unconnected, in accordance with what is generally known as an "exploded" view.

Fig. II is a longitudinal vertical section through a single-piece conduit and through a receptacle assembly, comprising the elements shown in Fig. I, and showing the receptacle mounted in the conduit.

Fig. III is a view partially in elevation, and partially in vertical longitudinal section showing the receptacle of Figs. I and II mounted in a conduit, and showing also a shade holder mounted in the conduit, in conjunction with the receptacle.

Fig. IV is a detail plan view of a preferred engaging element, forming part of the receptacle assembly, for engaging the receptacle assembly in mounted position in the conduit.

Fig. V is a cross-sectional view, taken on the line V—V of Fig. IV.

Fig. VI is a plan view illustrating the position of a blade plug receptacle in a conduit.

Fig. VII is a vertical longitudinal section through a conduit and through a blade plug receptacle comprising the invention, showing the receptacle in the manner of an "exploded" view.

Fig. VIII is a vertical longitudinal section through a conduit and through a blade plug receptacle comprising the elements shown in Fig. VII, showing the receptacle assembly mounted in the conduit.

Fig. IX is a vertical cross-sectional view through the conduit and receptacle, taken on the line IX—IX of Fig. VIII.

In the drawings, reference numeral 1 designates a single-piece conduit used as a duct for electrical wire 2. Considering Figs. I and II, which show a screw plug receptacle, the receptacle comprises a base 3 of insulating material, binding posts 4 on the base 3, and a contact structure also carried by the base.

The contact structure, generally considered, comprises a screw shell 5, which surrounds a resilient contact member proper 6. Contact member 6 is secured to the base 3 of the receptacle by means of a screw 7, which also electrically connects the contact member with a conducting plate 8 in contact with one of the binding posts 4. A second conducting plate 8a makes contact between the screw shell 5 and the other of the binding posts 4. Screw shell 5, as is usual in receptacles of this type, is adapted to receive a screw plug, or lamp, which when screwed down to the limit of its movement, makes electrical contact with contact member 6. Exteriorly, screw shell 5 may have threaded thereto a cap, such as the cap 9 shown in Figs. I and II. This cap 9 has a lower cutaway portion which tapers downwardly to provide an inclined face 9a, and which forms a horizontal ledge at its juncture with the main body of the cap. Desirably, this horizontal ledge is formed with an annular concavity 9b, having a peripheral edge 9c, for the accommodation and compression of a gasket.

In assembled position of the receptacle, as shown in Fig. II of the drawings, ledge 9b of the cap contacts the outer face of duct 1, when the cap is screwed down on the screw shell 5. Desirably a gasket 10, of rubber or other suitable compressible material, is interposed between the ledge on the cap and the outer face of the duct 1, in order to provide a water-tight seal at the orifice 11 into which the receptacle is inserted.

In order that the receptacle assembly may be mounted in position in the orifice 11 of the duct, upon insertion from beyond the outer face of the duct, I provide resilient means, carried by the receptacle assembly, which are formed and positioned to engage the receptacle assembly to the duct at the edge of the orifice 11 therein. My preferred resilient means, for engaging the receptacle assembly to the duct, are resilient tangs 12, which are attached to the base 3 of the receptacle, and which extend upwardly and outwardly therefrom.

The tangs 12 may conveniently, as shown in Figs. IV and V, be made integral with a plate 13, which is clamped to the upper face of the receptacle base 3 as by interposition between the upper face of the base and an insulating plate 14, upon which the base of screw shell 5 rests. It will be seen in Fig. IV of the drawings that plate 13 is cut away interiorly in such manner that the support 15 for the contact member 6 and the screw 7, may extend through it.

Each of the tangs 12 is formed adjacent its upper terminal to provide a recessive hook 12a, which forms a seat to embrace the edge of duct orifice 11.

Upon insertion of the receptacle into the duct, tangs 12, since they extend both upwardly and outwardly from the base 3, are forced radially inward by contact with the edge of conduit orifice 11, and, when the receptacle has been fully inserted in the conduit, are in such position that their hooks 12a engage the edge surrounding orifice 11. Also, as cap 9 is screwed downwardly on screw shell 5, the inclined face 9a in the lower region of the cap tends to force tangs 12 outwardly and against the edge of the orifice. Cap 9 thus provides a backing for tangs 12, and causes them to form a positive lock with the edge of orifice 11.

In Figs. VI to IX inclusive of the drawings the invention is shown as applied to a receptacle of the blade plug type, for engaging a receptacle of that type in a duct, which is similarly designated in these figures of the drawings by the reference numeral 1. As shown, this type of receptacle comprises a block of insulating material forming the receptacle base 16, which carries binding posts 17 for the electrical connection of conductive wires 18. Electrically connected at the binding posts are conducting contact elements 19, each comprising an upstanding prong 19a.

A cap structure 20 is arranged to cooperate with base 16 and contact prongs 19a, and is provided with vertically extending recesses 21 for receiving the contact prongs in position to be contacted by the blades of a blade plug. Cap 20 has its exterior surface 20a downwardly inclined, and adjacent its lower extremity is provided with a peripheral groove 20c. In this modification, the cap is shown as provided with a simple horizontal ledge 20b to contact the outer face of the duct adjacent the receptacle receiving orifice. If, desired, however, this ledge may be made annularly concave in conformity with the showing of Figs. I and II.

In this specific embodiment of the invention also, I prefer to use resilient tangs, such as the tangs 22, for engaging the receptacle assembly in the duct. These tangs 22, like the tangs 12 previously described, may desirably be formed integral with a plate 23 attached to the base. As shown, this plate 23 underlies the base 16 of the receptacle, and is secured thereto by suitable means, such as rivets 24.

Tangs 22 are inset part-way of their length at a shoulder 22a to provide an upper tang portion which extends angularly outward to an increased degree. Tangs 22 are also terminally formed with recessive hooks 22b. The provision of the offset 22a, and the hooks 22b, gives a structure which extends angularly a degree sufficient to bear against the edge of the orifice 11 with appreciable force.

In installing the receptacle in a simple orifice formed in the outer face of a duct, base 16 is inserted through the orifice so that the regions 22c on tangs 22 bear against the edge of the orifice during insertion, and the hooked terminals 22b of the tangs snap into engagement with the edge of the orifice when the receptacle has been inserted a sufficient distance into the duct.

When cap 20 is applied, the inclined outer face of the cap structure bears against the tangs 22, and the offset region 22a of each of the tangs engages an angular groove 20c in the cap structure, engaging the cap 20 to the base 16. This cap, also, performs in assembly a secondary and useful function in forcing the resilient tangs 22 positively into engagement with the edge of duct orifice 11.

It should be understood that with this type of receptacle also, a gasket similar to the gasket 10 may be used to lie against ledge 20b of the cap and to bear against the upper face of the duct adjacent the edge of the orifice 11 therein. It may be noted that, as used in conjunction with either cap and with either type of receptacle, a gasket should be so compressible that it is not prevented from forming a seal between the ledge of the cap and the outer face of the duct by the local interposition of the terminal hooks on the resilient tangs.

In Fig. III of the drawings I show a lamp shade holder 25 which is provided at its base with deformed tangs 26. These tangs 26 on the lamp shade are formed recessively at 26a to engage the edge of the orifice in duct 1, and are reversely bent terminally at 26b. It should be explained that, in mounting the shade holder, tangs 26 are engaged to the edge of orifice 11 in the intervals between the tangs 12 by which the receptacle is positioned in and engaged to the duct. While the receptacle is shown as used in conjunction with a single piece duct, which is complete in itself, it is to be understood that it has equal utility, and may be used to equal advantage, in conjunction with a duct which forms merely a trough, and which is at its base completed by mounting upon a fixed surface. Such trough formed duct may obviously be suitably installed upon various underlying structures, such as the walls or ceilings of railway cars, auto-buses and similar surfaces.

I claim as my invention:

1. For use in conjunction with a closed duct for electrical wiring having a simple receptacle receiving orifice therein a receptacle adapted to engage in a simple orifice of the duct upon insertion thereinto from the outer face of the duct comprising a base, an electrical contact structure carried by the base, yielding means lying horizontally outward of the contact structure in position to bear against the orifice and engage the receptacle assembly in fixed position with respect thereto, and a cap member having a constricted lower region shaped for interposition between the said contact structure and the said yielding means and as so interposed positively to force the said yielding means against the edge of the duct orifice.

2. For use in conjunction with a closed duct for electrical wiring having a simple receptacle receiving orifice therein, a receptacle adapted to engage in a simple orifice of the duct upon insertion thereinto from beyond the outer face of the duct comprising a base, an electrical contact structure carried by the base, resilient tangs extending upwardly from the base outwardly of the contact structure and inclining outwardly from the base, said tangs having therein seats for receiving an edge structure contacted by the tangs upon insertion of the receptacle base into the orifice, and a cap member having a constricted lower region shaped for interposition between the said contact structure and the said tangs and as interposed positively to force the said resilient tangs against the edge of the duct orifice.

3. For use in conjunction with a closed duct for electrical wiring having a simple receptacle receiving orifice therein, a receptacle adapted to engage in a simple orifice of the duct comprising a base of electrical insulating material, a resilient metallic plate attached to the base and having integral tangs extending upwardly and outwardly from the base to contact the edge of an orifice through which the base is inserted, an electrical contact structure carried by the base within the area defined by the tangs, and a cap member having a constricted lower region shaped for interposition between the said contact structure and the said tangs and as interposed positively to force the said resilient tangs against the edge of the duct orifice.

4. For use in conjunction with a closed duct for electrical wiring having a simple receptacle receiving orifice therein, a receptacle constructed for mounting in a simple orifice of the duct by insertion from beyond the face of the duct comprising a base, a contact structure on the base comprising a screw shell adapted for the reception of a screw plug and surrounding an electrical contact, resilient means arranged to lie outwardly of the screw shell in horizontally spaced relation thereto, and a cap member threaded to the screw shell and arranged to intervene between the screw shell and the edge of the duct orifice to force the said resilient means against the edge of the duct orifice firmly to engage the receptacle assembly thereto and position it in the duct when the receptacle is inserted through the orifice.

5. For use in conjunction with a closed duct for electrical wiring having a simple receptacle receiving orifice therein, a receptacle constructed for mounting in a simple orifice of the duct by insertion thereinto from beyond the face of the duct comprising a base, electrical contact springs extending upwardly from the base, a cap member having therein a ledge for contacting the outer face of the duct and a constricted lower region having therein recesses for receiving the contact springs, and resilient means arranged to lie between the constricted lower region of the cap member and the edge of the duct orifice and to be forced against the edge of the duct orifice by the cap member firmly to engage the receptacle assembly in position in the duct.

6. In a raceway assembly for electrical wiring the combination of a closed duct having a receptacle-receiving orifice in the outwardly presented face thereof with a receptacle adapted to engage in the duct orifice upon insertion thereinto from beyond the outer face of the duct; said receptacle comprising in assembly a base, an electrical contact structure carried by the base, yielding means carried by the receptacle assembly horizontally outward of the contact structure and arranged resiliently to engage the edge of the duct orifice thereby to engage the receptacle in position in the duct; and a cap member lying horizontally outward of the contact structure and horizontally inward of said yielding means, said cap member being arranged positively to hold said yielding means to the edge of the duct orifice.

7. In a raceway assembly for electrical wiring the combination of a closed duct having a receptacle-receiving orifice in the outwardly presented face thereof with a receptacle adapted to engage in the duct orifice upon insertion therein from beyond the outer face of the duct; said receptacle comprising a base, an electrical contact structure carried by the base, resilient tangs extending upwardly from the base outwardly of the contact structure and inclining outwardly from the base into contact with the edge of the duct orifice, said tangs having therein seats engaging the edge of the duct orifice in position of the receptacle fully inserted in the duct, and a cap member having an upper region arranged to rest upon the outer surface of the duct surrounding the receptacle-receiving orifice therein and a lower constricted region arranged to lie inwardly of said resilient tangs positively to hold the same to the edge of the receptacle-receiving orifice in the duct.

8. In a raceway assembly for electrical wiring and the mounting of electrical lamps, the combination of a closed duct having a receptacle-receiving orifice in the outwardly presented face thereof, with a receptacle for an electric lamp, and a holder for a shade to surround an electrical lamp mounted in the receptacle; said receptacle comprising in assembly a base, an electrical contact structure carried by the base, and yielding means carried by the receptacle assembly horizontally outward of the contact structure and arranged resiliently to engage the edge of the duct orifice thereby to engage the receptacle in position in the duct, a cap member lying horizontally outward of the contact structure and horizontally inward of said yielding means, said cap member being arranged positively to hold said yielding means to the edge of the duct orifice; said shade holder comprising a body having thereon resilient tangs terminally hooked to embrace said resiliently to engage the edge of the duct orifice, said tangs being interposed between the wall of the duct and the cap of the receptacle assembly and held by the receptacle cap positively engaged to the duct.

9. In a raceway assembly for electrical wiring and the mounting of electrical lamps the combination of a closed duct having a receptacle-receiving orifice in the outwardly presented face thereof, with a receptacle for an electric lamp, and a holder for a shade to surround an electrical lamp mounted in the receptacle; said receptacle comprising a base, an electrical contact structure carried by the base, and resilient tangs extending upwardly from the base outwardly of the contact structure and inclining outwardly from the base into contact with the edge of the duct orifice, said tangs having therein seats engaging the edge of the duct orifice in position of the receptacle fully inserted in the duct; said shade holder comprising a body having thereon tangs terminally hooked to engage the edge of the duct orifice and spaced to lie in the intervals between the tangs of the receptacle; and a cap member lying horizontally outward of the contact structure and horizontally inward of said yielding means, said cap member being arranged positively to hold said yielding means to the edge of the duct orifice.

L ALAN SHARP.